F. SCHILLER.
ELASTIC TIRE.
APPLICATION FILED OCT. 4, 1909.
992,603.
Patented May 16, 1911.
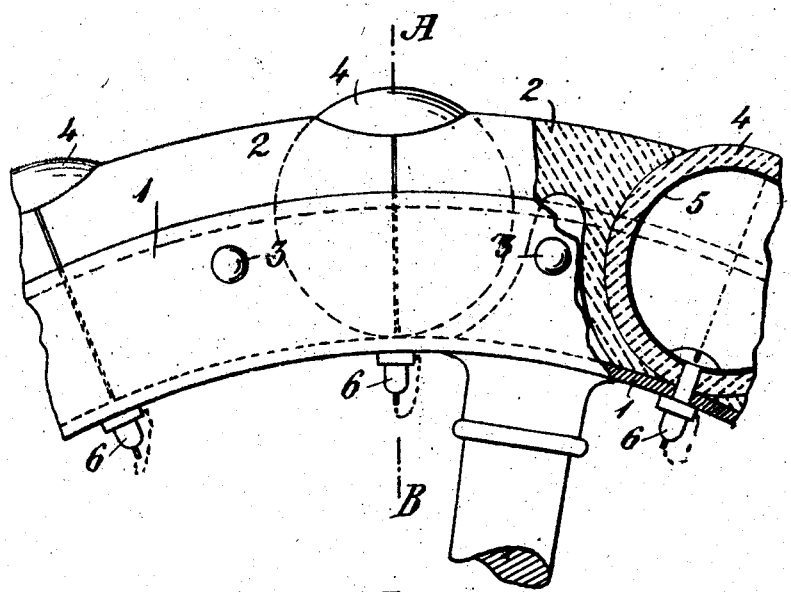
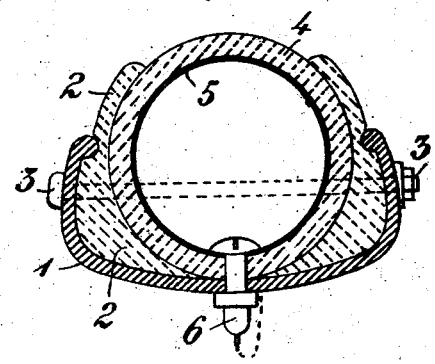
WITNESSES
INVENTOR
Ferdinand Schiller
BY
ATTORNEYS

UNITED STATES PATENT OFFICE.

FERDINAND SCHILLER, OF PRAGUE, AUSTRIA-HUNGARY.

ELASTIC TIRE.

992,603.  Specification of Letters Patent.  Patented May 16, 1911.

Application filed October 4, 1909.  Serial No. 520,871.

*To all whom it may concern:*

Be it known that I, FERDINAND SCHILLER, a subject of the Emperor of Austria-Hungary, residing at Prague, Empire of Austria-Hungary, have invented certain new and useful Improvements in Elastic Tires; and I do hereby declare the following to be a full, clear, and exact description of the invention, such as will enable others skilled in the art to which it appertains to make and use the same.

This invention relates to elastic tires for road vehicles of all kinds and has for its object to provide an elastic tire of great strength and durability and that may be readily and easily repaired.

In the accompanying drawing Figure 1 is a side elevation partly in section of a tire constructed in accordance with my invention and Fig. 2 is a transverse section of the same on the line A B, Fig. 1.

1 is a felly of any preferred construction; in this felly a series of rubber blocks 2 is so mounted that their sides are overlapped and grasped by the inwardly projecting rims of the felly while the adjacent ends of neighboring blocks are in contact with each other. Besides the blocks may be secured to the felly by bolts 3 passing through the said blocks and the felly. Between any two of neighboring blocks a hollow rubber body 4 is interposed which hollow body is received by suitable recesses in the end faces of the blocks and which is adapted to be inflated by air under pressure. The walls of these hollow bodies are of considerable thickness for resisting the required high pressure and each of the hollow bodies incloses a soft rubber bag 5 provided with a valve 6 of any known or preferred construction for inflating such bag. The hollow bodies 4 are preferably spherical in shape. If desired the blocks 2 may be hollow and inflated by air under pressure. The hollow bodies project beyond the blocks and constitute the running surface. As the hollow bodies come against the ground while the wheel is running on the latter, they are compressed until they become flush with the outer surface of the rim and thereby deaden all shocks and insure an easy smooth movement of the vehicle. Any injury to one or even more of these hollow bodies and the escape of air under pressure consequent thereupon only slightly impairs the elasticity of the tire as a whole. The wear and tear of the tire so constructed is only slight and in case of injury only the blocks and hollow bodies injured have to be removed and repaired or replaced by others. For this purpose it is sufficient to release the blocks adjacent to a hollow body for instance by unscrewing the bolts 3 and to slightly turn them outward whereupon the hollow body and if required the blocks themselves may be removed and either the former or also the latter may be replaced by fresh ones.

Claims:

1. In an elastic tire the combination of a felly, a plurality of blocks mounted therein, the adjacent end faces of neighboring blocks being in contact with each other and being provided with recesses opposite each other, hollow bodies interposed between the said adjacent end faces of neighboring blocks and into the said recesses, such hollow bodies being adapted to be inflated by air under pressure individually and projecting beyond the periphery of the blocks.

2. A tire, comprising a plurality of elastic blocks forming a tire body, said blocks having recessed ends, and hollow spherical inflatable bodies between the blocks in the recesses thereof and projecting beyond the faces of said blocks.

In testimony whereof, I affix my signature, in presence of two witnesses.

FERDINAND SCHILLER.

Witnesses:
 KRISTIAN VOJER,
 ROUEL STANFL.